US010639563B2

(12) United States Patent
Xiong et al.

(10) Patent No.: US 10,639,563 B2
(45) Date of Patent: May 5, 2020

(54) APPARATUS AND METHOD FOR GRAVITY SEPARATION AND CONTAINED OIL AND NATURAL GAS PRODUCTION SYSTEMS AND METHODS (71) Applicant: General Electric Company, Schenectady, NY (US)

(72) Inventors: Rihua Xiong, Shanghai (CN); Jiyang Xia, Shanghai (CN); Chenqian Zhang, Shanghai (CN); Ying Zhou, Shanghai (CN); Ming Lei, Shanghai (CN)

(73) Assignee: VETCO GRAY SCANDINAVIA AS, Stravanger (NO)

( * ) Notice: Subject to any disclaimer, the term of this patent is extended or adjusted under 35 U.S.C. 154(b) by 0 days.

(21) Appl. No.: 15/755,559

(22) PCT Filed: Aug. 26, 2016

(86) PCT No.: PCT/US2016/048866
§ 371 (c)(1),
(2) Date: Feb. 27, 2018

(87) PCT Pub. No.: WO2017/035427
PCT Pub. Date: Mar. 2, 2017

(65) Prior Publication Data
US 2018/0250611 A1 Sep. 6, 2018

(30) Foreign Application Priority Data
Aug. 27, 2015 (CN) .......................... 2015 1 0536181

(51) Int. Cl.
*B01D 17/025* (2006.01)
*E21B 43/34* (2006.01)
(Continued)

(52) U.S. Cl.
CPC ..... *B01D 21/0051* (2013.01); *B01D 17/0208* (2013.01); *B01D 17/0214* (2013.01);
(Continued)

(58) Field of Classification Search
CPC ............ B01D 17/0214; B01D 19/0042; B01D 21/0051; B01D 21/0087; C02F 1/40; E21B 43/34; E21B 43/36
(Continued)

(56) References Cited

U.S. PATENT DOCUMENTS 1,482,688 A * 2/1924 Kygar ..................... E21B 43/34
137/171
1,559,115 A * 10/1925 Marker ................... E21B 43/34
96/184
(Continued)

FOREIGN PATENT DOCUMENTS

CN    201442893 U    4/2010
CN    104685154 A    6/2015
(Continued)

OTHER PUBLICATIONS

Kearney, M et al., "Industrial Membrane Filtration and Short-Bed Fractal Separation Systems for Separating Monomers from Heterogeneous Plant Material," United states department of energy (DOE), pp. 1-85 (Jan. 2001-Dec. 2004).
(Continued)

*Primary Examiner* — Christopher Upton
(74) *Attorney, Agent, or Firm* — Baker Hughes Patent Organization (57) ABSTRACT The present disclosure relates to an apparatus for gravity separation, which comprises a plurality of gravity separation modules. Each of the gravity separation modules comprises an inlet, a first outlet, a first conduit connecting the inlet and the first outlet, a second outlet located vertically different
(Continued)

from the first outlet, a second conduit in communication with the second outlet, and a plurality of third conduits connecting the first conduits and the second conduits. The present disclosure also relates to a corresponding method for gravity separation.

13 Claims, 7 Drawing Sheets

(51) Int. Cl.
| | |
|---|---|
| B01D 21/00 | (2006.01) |
| B01D 17/02 | (2006.01) |
| B01D 19/00 | (2006.01) |
| B01D 21/02 | (2006.01) |
| E21B 43/36 | (2006.01) |

(52) U.S. Cl.
CPC ......... *B01D 19/0042* (2013.01); *B01D 21/02* (2013.01); *E21B 43/34* (2013.01); *E21B 43/36* (2013.01)

(58) Field of Classification Search
USPC .............. 210/800, 801, 521, 522, 539, 540; 166/267, 75.12; 95/267; 96/182
See application file for complete search history.

(56) References Cited

U.S. PATENT DOCUMENTS

| | | | |
|---|---|---|---|
| 1,939,988 A | | 12/1933 | Knoles |
| 2,423,793 A | * | 7/1947 | Olivo ...................... E21B 43/34 210/535 |
| 4,708,793 A | * | 11/1987 | Cathriner ........... B01D 19/0042 166/267 |
| 5,288,312 A | * | 2/1994 | Payne ...................... E21B 43/34 95/254 |
| 6,164,458 A | | 12/2000 | Mandrin et al. |
| 7,278,543 B2 | | 10/2007 | Sagatun et al. |
| 7,490,671 B2 | | 2/2009 | Gramme et al. |
| 7,516,794 B2 | | 4/2009 | Gramme et al. |
| 7,575,681 B2 | | 8/2009 | Angelescu et al. |
| 7,901,492 B2 | | 3/2011 | Gramme et al. |
| 9,080,442 B2 | * | 7/2015 | Abrand .............. B01D 17/0214 |
| 9,095,799 B1 | * | 8/2015 | Packard .................. E21B 43/34 |
| 2005/0061515 A1 | | 3/2005 | Hopper |
| 2006/0162553 A1 | | 7/2006 | Esparza et al. |
| 2009/0145832 A1 | | 6/2009 | Gramme et al. |
| 2010/0180769 A1 | | 7/2010 | Grenstad et al. |
| 2010/0212492 A1 | | 8/2010 | Miotto et al. |
| 2010/0326922 A1 | | 12/2010 | Varanasi et al. |
| 2014/0290485 A1 | | 10/2014 | Prescott et al. |
| 2015/0300146 A1 | * | 10/2015 | Grave .................... E21B 43/36 166/368 |
| 2016/0317950 A1 | * | 11/2016 | Dang ..................... E21B 43/34 |
| 2018/0207550 A1 | * | 7/2018 | Xiong ................ B01D 19/0042 |

FOREIGN PATENT DOCUMENTS

| | | |
|---|---|---|
| CN | 106281522 A | 1/2017 |
| WO | 2014/160801 A1 | 10/2014 |

OTHER PUBLICATIONS

Kochergin, V., and Kearney, M., "Existing Biorefinery Operations That Benefit From Fractal-Based Process Intensification," Applied Biochemistry and Biotechnology, vol. 129-132, pp. 349-360 (2006) (Abstract).

Zhao, L., et al., "Numerical Simulation and Experimental Study on Helical Pipe Oil-Water Separator for Deoiling," 3rd International Conference on Bioinformatics and Biomedical Engineering, pp. 1-3 (Jun. 11-13, 2009) (Abstract).

International Search Report and Written Opinion issued in connection with corresponding PCT Application No. PCT/US2016/048866 dated Nov. 16, 2016.

International Preliminary Report on Patentability issued in connection with corresponding PCT Application No. PCT/US2016/048866 dated Feb. 27, 2018.

First Office Action and Search issued in connection with corresponding CN Application No. 201510536181.4 dated Apr. 2, 2018.

* cited by examiner

APPARATUS AND METHOD FOR GRAVITY SEPARATION AND CONTAINED OIL AND NATURAL GAS PRODUCTION SYSTEMS AND METHODS

BACKGROUND OF THE INVENTION

The present disclosure relates to an apparatus and a method that is used for gravity separation, and to oil and natural gas production systems and methods.

Material separation is required in many fields. For example, in the oil and natural gas industry, exploited oily gas often consists of liquid (such as oil and water), solid, and/or a combination of gas, which will need to be separated in the production process to obtain the final product.

Some of the existing devices and methods use gravity to separate materials, but the results of separation using these devices and methods do not always meet the different needs associated with various production processes.

Therefore, there is a need for a new apparatus and method for gravity separation. which involves oil and natural gas production systems and methods.

BRIEF DESCRIPTION OF THE INVENTION

In one aspect, the embodiments of the present invention relate to a gravity separation device, which includes a plurality of gravity separation modules. Each of the gravity separation modules includes an inlet, a first outlet, a first conduit connecting the inlet and the first outlet, a second outlet which is different from the first outlet in the vertical direction, a second conduit which is in communication with the second outlet, and a plurality of the third conduits connecting the first conduits and the second conduits.

In another aspect, an embodiment of the present invention relates to an oil and natural gas production system for gravity separation.

In another aspect, an embodiment of the present invention relates to a method for gravity separation, which includes an awaiting-separation flow of a first substance and a second substance that is included in the entry of an inlet of a gravity separation module. Additionally, the density of the first substance is higher than the density of the first substance; and the concentration of the output of first product stream is different from the concentration of the output of second product stream.

In another aspect, an embodiment of the present invention relates to an oil and natural gas production system for gravity separation.

BRIEF DESCRIPTION OF THE DRAWINGS

Please refer to the figures and the following detailed description, which point out the features, aspects and advantages of the present invention.

DETAILED DESCRIPTION

Unless otherwise defined clearly in the present disclosure, the meaning of the scientific and technical terms used in the present disclosure is the meaning understood by those skilled in the art. The present disclosure used terms like "includes", "including", "having" or "contain" and other similar terms with a meaning within the same range.

The approximate terms that appear in the present disclosure are used to modify a quantity, and to show that embodiments of the present invention are not limited to a specific quantity. The disclosure further includes modified portions which are close to the quantity and are also acceptable, and will not lead to changes in the relevant basic functions of the embodiments. The use of terms like "about", "approximate", "about" are used to indicate that embodiments are not limited to a precise value. In some embodiments, the approximate terms may correspond to the accuracy of the instrument with its measured values.

In the present application, unless clearly stated otherwise, all items in the singular and plural form shall not be limited. The use of "first", "second", "third", "fourth" and similar words throughout the application does not denote any order, quantity, or importance, but rather is used to distinguish between different structures, configurations, performance parameters, and other elements or embodiments.

Unless the context has clearly indicated otherwise, the term "or" is not exclusive, but rather refers to the existence of at least one of the mentioned items (e.g., components), and includes a situation where the combination of the mentioned items may exist.

The present disclosure refers to "some embodiments", etc., representing that a particular element that is associated with the present disclosure (such as characteristics, structure, and/or features) is included in at least one embodiment described in the application, which may or may not be visible in other embodiments. Further, the embodiments of the invention may be combined in any suitable manner.

In the following description, we will illustrate the embodiments of the present invention in accordance with the figures, instead of detailing the well-known functions and structures to avoid unnecessary confusion in the present disclosure due to details.

FIGS. 1-7 show schematic diagrams of a device 100, 200, 300, 400, 500, 600, 700 for gravity separation according to embodiments of the present invention. The device 100, 200, 300, 400, 500, 600, 700 includes a plurality of gravity separation modules 110, 210, 310, 410, 510, 610, 710. Each of the gravity separation modules 110, 210, 310, 410, 510, 610, 710 includes an inlet 111, 211, 311, 411, 511, 611, 711, a first outlet 112, 212, 312, 412, 512, 612, 712, and a first conduit 113, 213, 313, 413, 513, 613, 713 connecting the inlet 111, 211, 311, 411, 511, 611, 711 and the first outlet 112, 212, 312, 412, 512, 612, 712. Each gravity separation module also includes a second outlet 114, 214, 314, 414, 514, 614, 714, which is different from the first outlet 112, 212, 312, 412, 512, 612, 712 in the vertical direction. Furthermore, each gravity separation module includes a second conduit 115, 215, 315, 415, 515, 615, 715 which is in communication with the second outlet 114, 214, 314, 414, 514, 614, 714. Additionally, there is a plurality of third conduits 116, 216, 316, 416, 516, 616, 716 which connect the first conduit 113, 213, 313, 413, 513, 613, 713 to the second conduit 115, 215, 315, 415, 515, 615, 715.

"Awaiting-separated flow" and other similar terms used in the present disclosure refer to substance combination used for gravity separation. In some embodiments, the awaiting-separated flow includes solid, liquid, gas or any combination thereof. In some embodiments, the awaiting-separated stream includes two or more different liquids, such as water and oil.

In some embodiments, they contain awaiting-separated stream containing different density of the first and second substances 150, 250, 350, 450, 550, 650, 750 which enters into the device 100, 200, 300, 400, 500, 600, 700 through the inlet 111, 211, 311, 411, 511, 611, 711. In some embodiments, the density of the first material is less than that of the second material.

In each gravity separation module 110, 210, 310, 410, 510, 610, 710 the awaiting-separated stream 150, 250, 350, 450, 550, 650, 750 goes forward along the first conduit, 113, 213, 313, 413, 513, 613, 713 and in the area where the first conduit 113, 213, 313, 413, 513, 613, 713 connect to the third conduit 116, 216, 316, 416, 516, 616, 716, the stream is divided into two parts. Based on the different densities, one part keeps going forward along the first conduit, 113, 213, 313, 413, 513, 613, 713 and another part enters into the third conduit 116, 216, 316, 416, 516, 616, 716. In the first outlet, 113, 213, 313, 413, 513, 613, 713 the multi-stage gravity separation part contains a higher concentration of the first substance 151, 251, 351, 451, 551, 651, 751. The product steam which enters into the third conduit 116, 216, 316, 416, 516, 616, 716 contains a higher concentration of the second substance 152, 252, 352, 452, 552, 652, 752 and exits from the second outlet 114, 214, 314, 414, 514, 614, 714, through the second conduit 115, 215, 315, 415, 515, 615, 715.

As long as it meets the requirements for the separation and is adapted to the specific substance composition in the awaiting-separated flow, the device that is used for gravity separation and involved in the embodiments of the present invention may include gravity separation modules containing any combination thereof. The means for gravity separation may include gravity separation modules that are connected as per the order. In some embodiments, as shown in FIGS. 1-6, the second outlet, 112, 212, 312, 412, 512, 612 of the former gravity separation module 110, 210, 310, 410, 510, 610 connects to the inlet 111, 211, 311, 411, 511, 611. In this case, the product stream 110, 210, 310, 410, 510, 610 that exits from the second outlet 114, 214, 314, 414, 514, 614 of the prior gravity separation module 152, 252, 352, 452, 552, 652, 752 is the awaiting-separated stream of the subsequent gravity separation module 110, 210, 310, 410, 510, 610 and it acquires further separation by the foregoing manner in the subsequent gravity separation module 110, 210, 310, 410, 510, 610.

Figure 1:
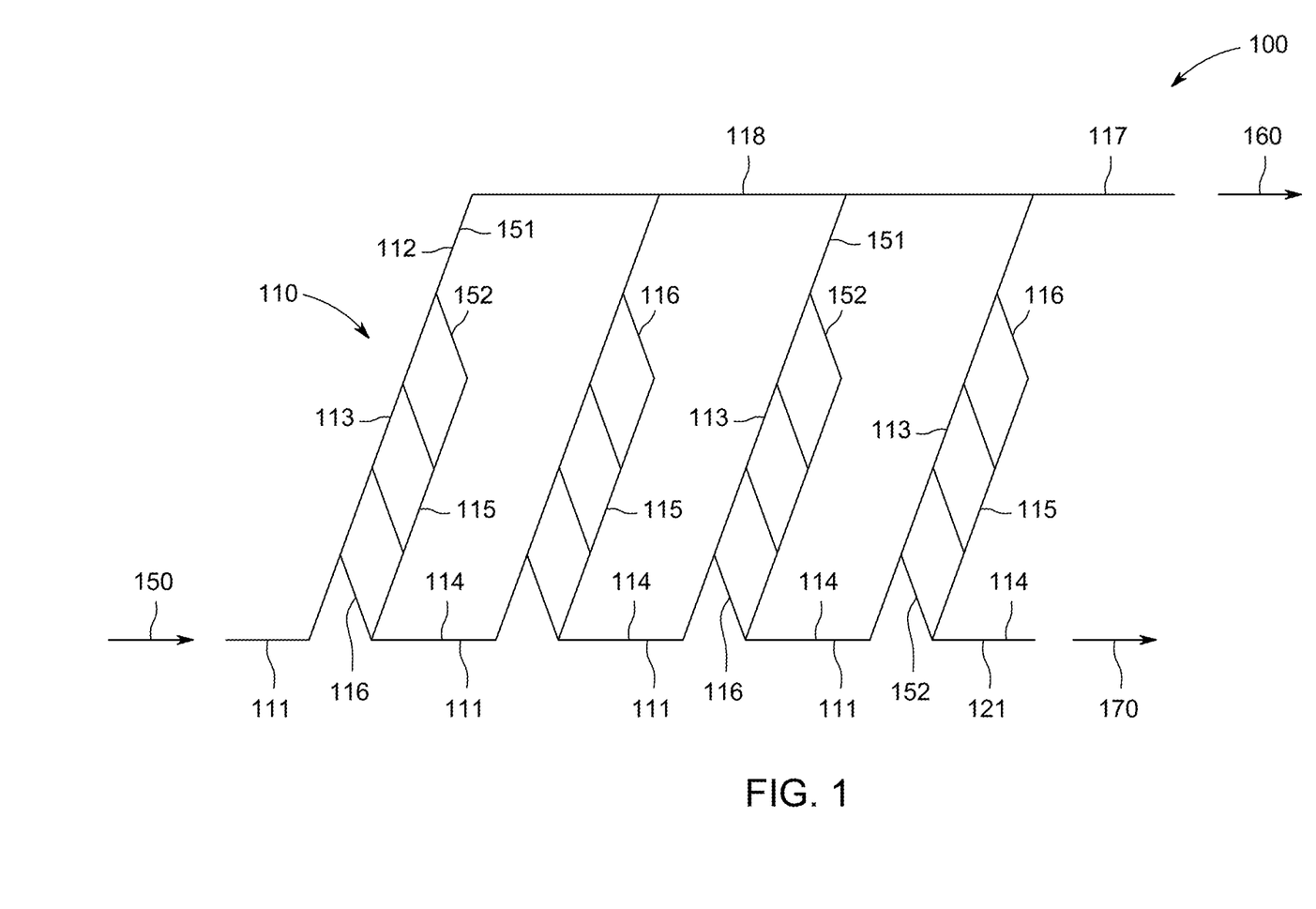
FIGS. 1, 2, 3, 4, 5, 6 and 7 show a schematic view of the device for gravity separation that is involved in the embodiments of the present invention.
Figure 2:
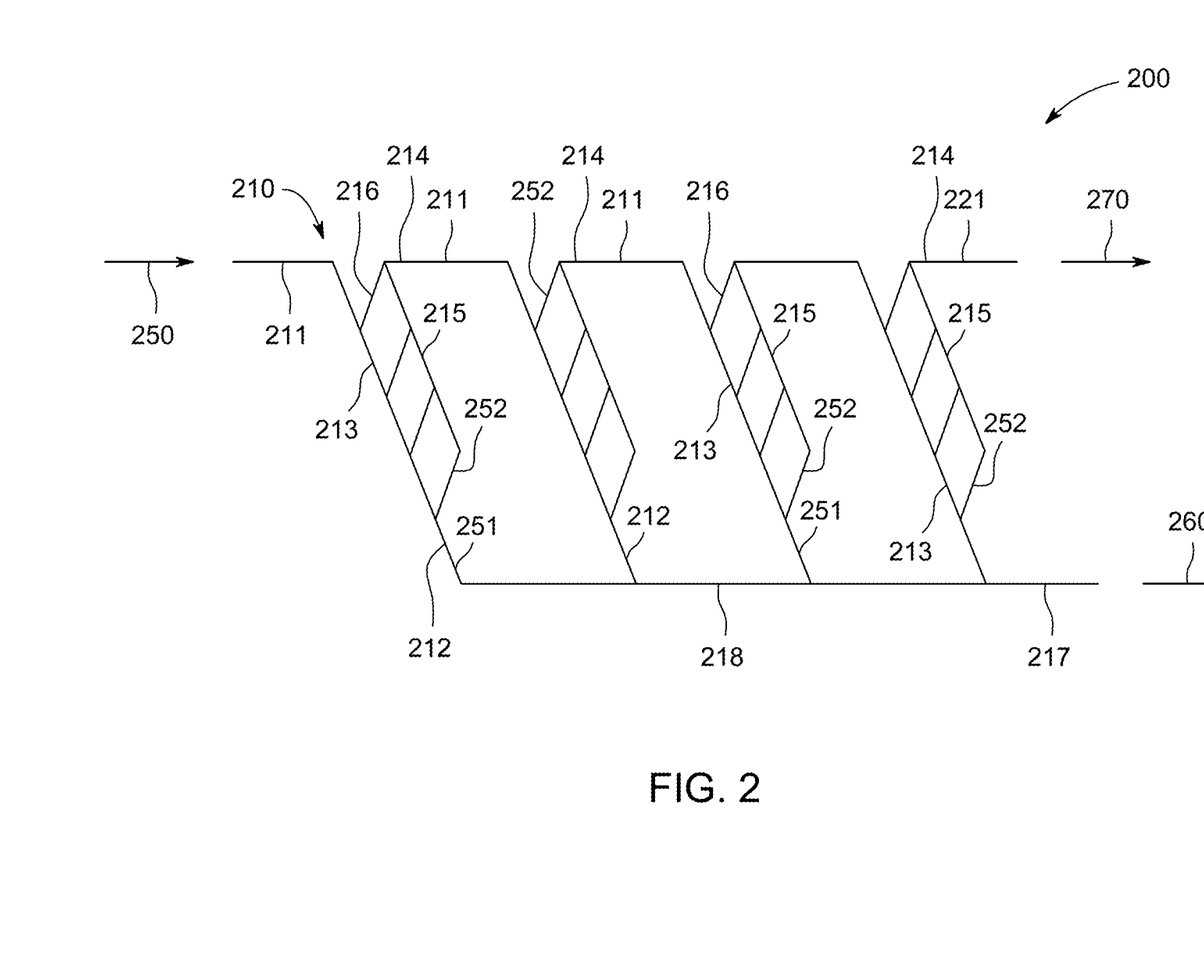

The device used for gravity separation may include a plurality of gravity separation modules connected with each other as per sequence. In some embodiments, as shown in FIG. 1-2 the second outlet 114, 214 of the prior gravity separation module 110, 210 connects to the inlet 111, 211 of the subsequent gravity separation module 110, 210 and all the first conduits 113, 213 are extending from the corresponding inlets 111, 211 in parallel. In this case, the product stream 110, 210 output from the second outlet 114, 214 of all prior gravity separation modules 152, 252 is the awaiting-separated flow of the subsequent gravity separation modules 110, 210 and it gets further separation from the subsequent gravity separation modules 110, 210.

In some embodiments, as shown in FIG. 1, all of the first conduits 113 extend from the correspondent inlet 111 obliquely. In some embodiments, all of the third conduit 116 extends downwardly from the correspondent first conduit 113. In some embodiments, all of the third conduit 116 extends from the corresponding first conduit 113 obliquely downward. The concentration of the first substance contained in the product stream 152 of the gravity separation module 110 is lower than that of the correspondent product stream 151.

In some embodiments, as shown in FIG. 2, all of the second conduits 213 extends from the corresponding inlet 211 diagonally downward. In some embodiments, all of the third conduit 216 extends upwardly from the correspondent first conduit 213. In some embodiments, all of the third conduit 216 extends from the correspondent first conduit 213 obliquely. The concentration of the first substance contained in the product stream 252 of the gravity separation module 210 is higher than that of the correspondent product stream 251.

The means for gravity separation may include gravity separation module that is in a sequence of connection and arrangement symmetrically. Two gravity separation modules that are adjacent and in symmetrical form and connecting with each other as per sequence of before and after. Two gravity separation modules that are adjacent and in symmetrical form and connecting with each other as per sequence of before and after, each of which may include several gravity separation modules that are adjacent and in symmetrical form and connecting with each other as per sequence of before and after. The means for gravity separation may include gravity separation modules that are lined up in asymmetrical form and/or unparallel form but connecting with each other as per sequence of before and after.

Figure 3:
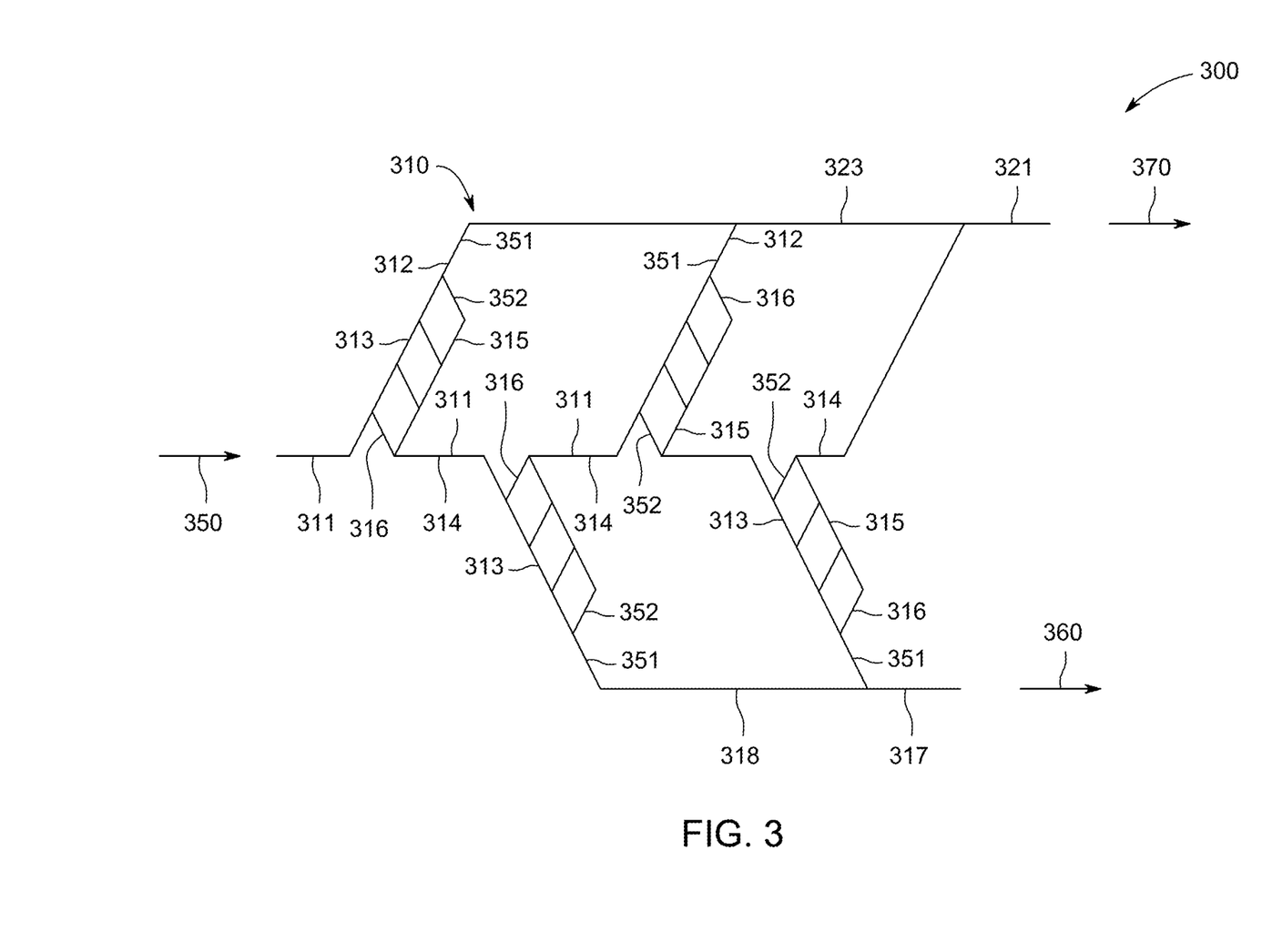

In some embodiments, as shown in FIG. 3, in two adjacent gravity separation modules 310, the first second outlet 314 is connected to the subsequent inlet 311. Two adjacent gravity separation modules 310 are symmetrical to each other. One of two adjacent gravity separation modules 310, the first conduit 313 extends from the correspondent inlet 311 along the first direction, and the first conduit 313 of the other gravity separation module of the two adjacent separation modules 310 extends from the correspondent inlet 311 along the second direction that is different from the first direction. And so on. The first direction can be upward, while the second direction can be downward, and vice versa. The product steam 352 of the gravity separation module 310, wherein the first conduit 313 extends upwardly from the corresponding inlet 311, has the concentration of the first substance contained less than that of the correspondent product stream 351. The product steam 352 of the gravity separation module 310 wherein the first conduit 313 extends upwardly from the corresponding inlet 311 has the concentration of the first substance contained higher than that of the correspondent product stream 351.

Figure 4:
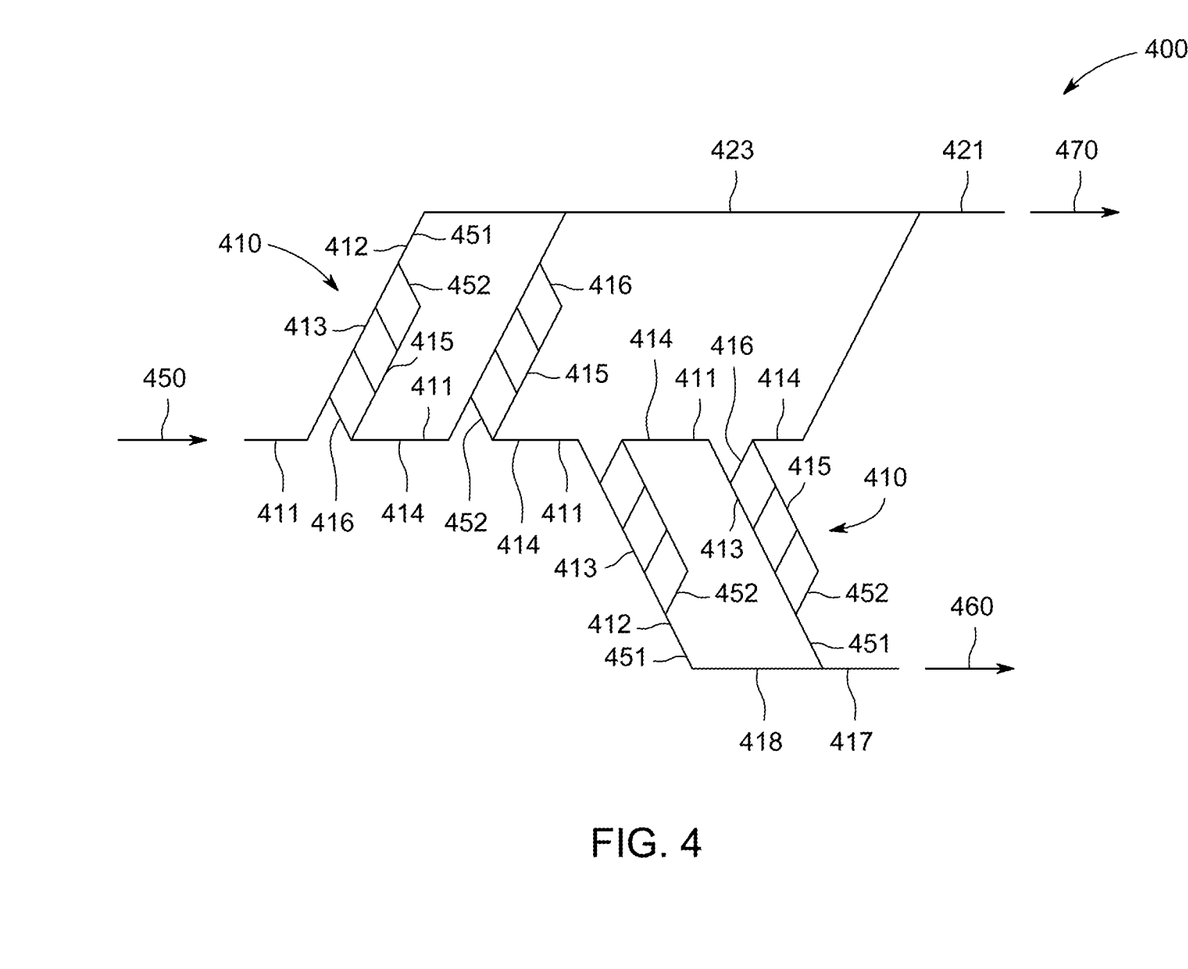

In some embodiments, as shown in FIG. 4, between two adjacent gravity separation modules 410, each of the preceding second outlet 414 connects to the subsequent inlet 411. Two adjacent gravity separation modules 410 are symmetrical to each other. In a group of adjacent gravity separation module 410, the first conduit 414 extends from the correspondent inlet 411 along the first direction in parallel, and the first conduit 414 of the other group of adjacent gravity separation module 410 extends from the correspondent inlet 411 along with the second direction in parallel that is different from the first direction. The first direction can be upward, while the second direction can be downward, and vice versa. The product steam 452 of the gravity separation module 410, wherein the first conduit 413 extends upwardly from the corresponding inlet 411, has the concentration of the first substance contained less than that of the correspondent product stream 451. The product steam 452 of the gravity separation module 410 wherein the first conduit 413 extends upwardly from the corresponding inlet 411 has the concentration of the first substance contained less than that of the correspondent product stream 451.

The means for gravity separation may include two gravity separation modules that are interconnected and combined together. The inlet, first conduit, second outlet and second conduit of the gravity separation modules that are interconnected and combined together may connect with each other respectively. The gravity separation module that is interconnected and combined together can share the same inlet and/or second outlet. The gravity separation module that is interconnected and combined together can be called a jointly combined gravity separation module.

Figure 5:
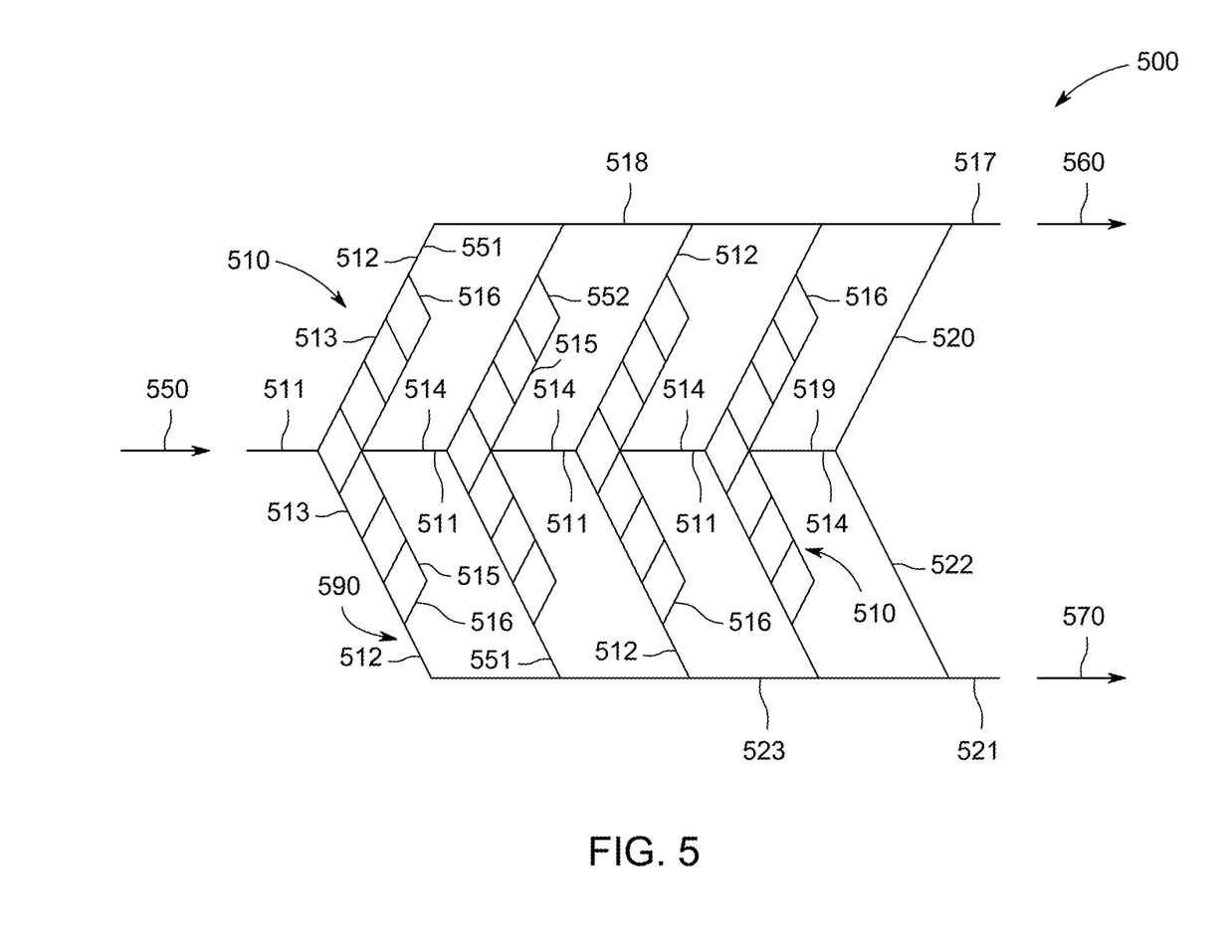
Figure 6:
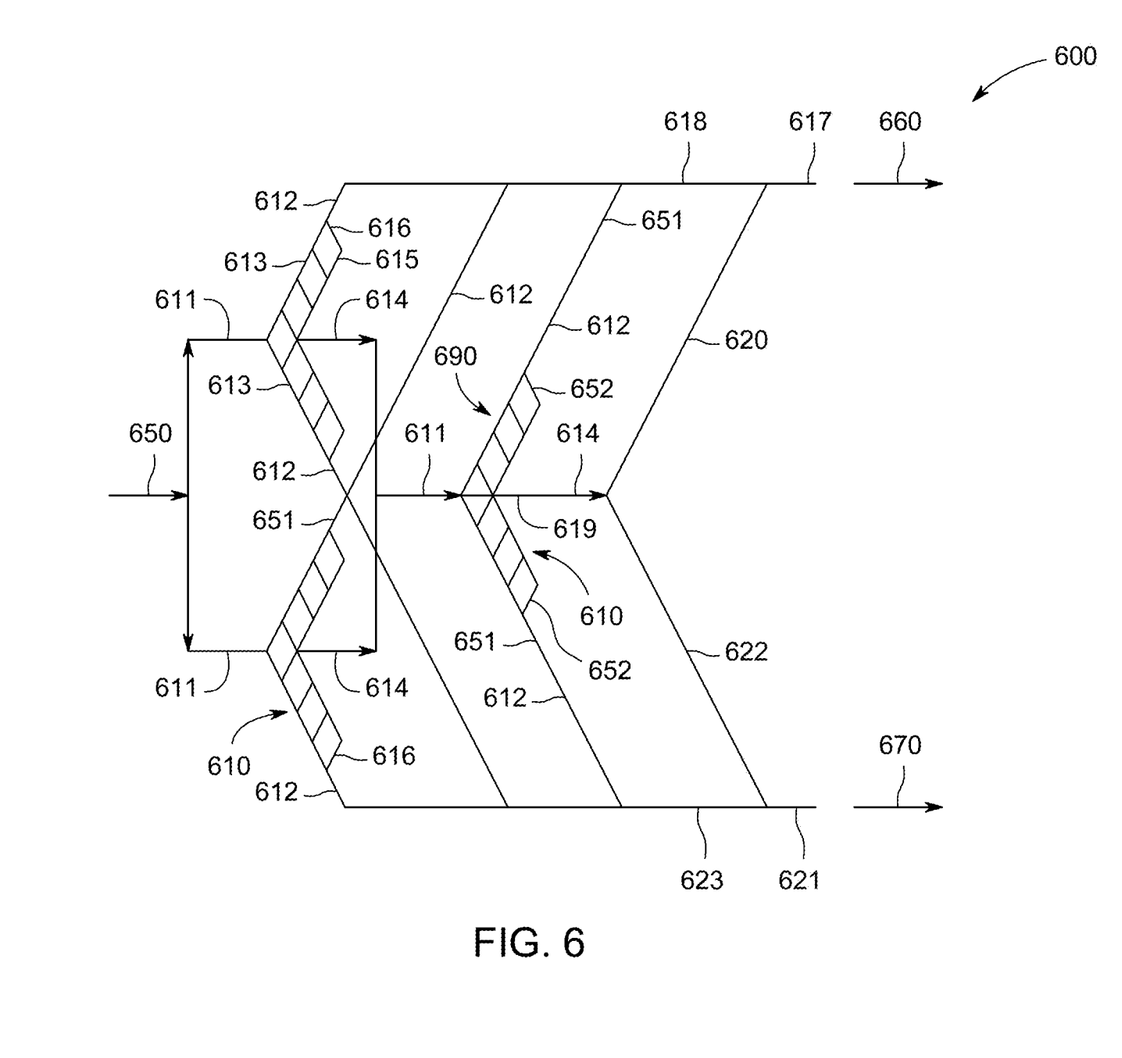
Figure 7:
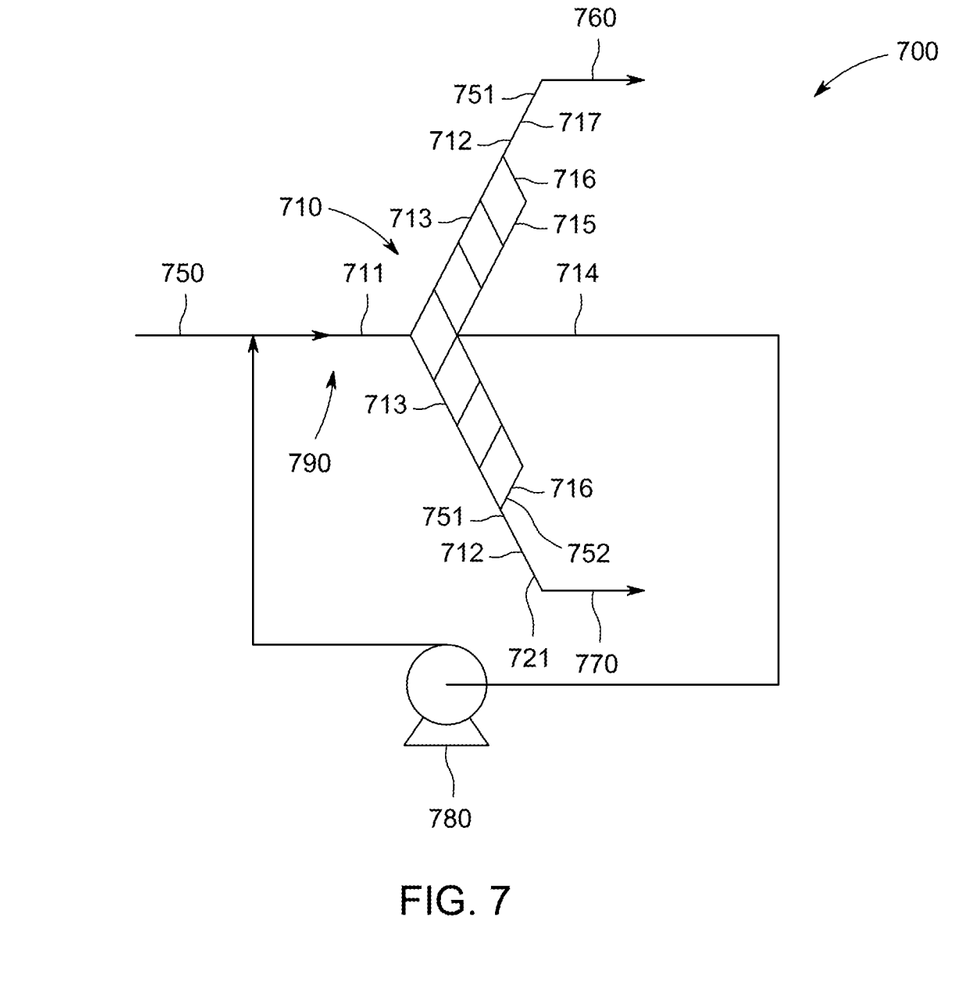

In some embodiments, as shown in FIG. 5-7, the inlets 511, 611, 711 of two gravity separation modules 510, 610, 710 can be communicating with each other respectively and connecting to the correspondent first conduit 514, 614, 714.

In some embodiments, as shown in FIG. 5-7, the inlets 514, 614, 714 of two gravity separation modules 510, 610, 710 can be communicating with each other respectively and connecting to the correspondent first conduit 515, 615, 715.

In some embodiments, as shown in FIG. 5, the gravity separation modules 510 with pair connection and combination respectively share the inlet 511 and the second outlet 514, which may be collectively referred to as a combination of gravity separation module 590. The second outlet 514 of the previous combination of gravity separation module 590 connects to the inlet 511 of the followed combination of gravity separation module inlet 590. And so on. In the combination of gravity separation module 590, two first conduits 513 respectively extend along different directions, e.g., vertical direction respectively. The place where the shared inlet 511 of the awaiting-separated flow 550 (inlet of a combination of gravity separation module) connecting to the correspondent two first conduits 513 is divided into two parts, which including the first conduit 513 that enters into two gravity separation modules 510, the part 513 that extends upward contains the concentration of first substance higher than the part of conduit 513 which extends downward. The two portions were then further separated in the foregoing manner at the correspondent gravity separation module 510. The first conduit 513 extending upwardly gravity separation module 510. The concentration of the first product stream containing less than 552 substances corresponding product stream 551. The first conduit 513 extending downward gravity separation module 510. The concentration of the first product stream 552 is higher than the corresponding substances containing product stream 551. Previous combination of gravity separation module 590 product stream 552 through both the second conduit 515 and the second outlet 514, for the subsequent combination of gravity separation module to be separated flow 590, enter the following inlet 511 in the foregoing manner further separation. Various embodiments, if each of the series combination of a gravity separation module 590, then the series of stages may be changed as needed.

In some embodiments, as shown in FIG. 6, prior pairwise combinations of gravity separation and connection module 610 connected to the second outlet 614 and subsequent pair wise combinations of mutually interlinked and inlet 611 interlinked and connected to the other two combined gravity separation module 610 and a second outlet 614 communicates.

In some embodiments, as shown in FIG. 6, a plurality of gravity separation modules 610 communicate with each other in the inlet 611. The input to be separated flow 650 communicated with each other in various inletting 611 separate gravity separation module 610. The first conduit 613 extending upwardly gravity separation module 610. The concentration of the first product stream 652 containing less than substances corresponding product stream 651. The first conduit 613 extending downward gravity separation module 610. The concentration of the first product stream 652 is higher than the corresponding substances containing product stream 651. The product stream 652 of the preceding gravity separation module 610 flows through the second outlet 615 and shared/going through the second outlet 614, which is the awaiting-separated flow which connects and combines the gravity separation module 610 subsequently and then input into the following common inlet 611, which is further separated in the foregoing manner. FIG. 6 shows after two combined previous gravity separation modules 690 were in parallel and be in a series with the followed combination of gravity separation module 690, that is, the upper one is two parallel combination of gravity separation module 690, while the lower one is a two-level series of combined gravity separation module 690. In other embodiments, the number of levels connected in series can be different, and the number of gravity separation modules in parallel in each stage may be different; in each stage, it also includes a series of combination of gravity separation modules. If you take the combined preceding stage of gravity separation module into account part of having only partially entering into the followed combination of gravity separation module, the number of combination of the followed stage of gravity separation module can be allowed to be less than that of the preceding stage of a combination of gravity separation module, as such you can further improve the efficiency of the gravity separation means.

In some embodiments, as shown in FIG. 7, the second outlet 714 of pair-wise combination and connection of gravity separation module 710 is interlinked with the inlet 711. The product steam 752 that is acquired by the awaiting-separated stream 750 by separating the pair-wise combination of the gravity separation module 710 is circulated and separated again through the shared second outlet 714 going back to the shared inlet 711. The number of cycle can be decided as per needs. In some embodiments, return the product stream 752 by means of pump 780 and other auxiliary facilities back to the inlet 711.

Some first outlets of a plurality of gravity separation modules in the embodiment of the present invention that are involved with the use of gravity separation means can be in communication with each other. In some embodiments, as shown in FIG. 1-6, the device 100, 200, 300, 400, 500, 600 which include the first product outlet 117, 217, 317, 417, 517, 617 and the fourth conduit 118, 218, 318, 418, 518, 618 that is connected to the first outlet 117, 217, 317, 417, 517, 617 and the first product 112, 212, 312, 412, 512, 612.

In some embodiments, as shown in FIG. 1-2, the first product outlet 117, 217 are connected to all first outlets 112, 212. The product stream 151 and 251 of all gravity separation modules 110, 210 aggregate through the fourth conduit 118, 218 to the first product stream 160, and 260 output from the first product outlet 117 and 217.

In some embodiments, as shown in FIG. 3-6, the first outlet 317, 417, 517, 617 are in communication with some of the first outlets 312, 412, 512, 612. The product stream 351 and 451 of those gravity separation modules 310 and 410 wherein the first outlet 312, 412 connect to the first product outlet 317 and 417 aggregate through the fourth conduit 318 and 418 to the first product stream 360 and 460 output from the first product outlets 317 and 417a.

In some embodiments, as shown in FIG. 5-6, the gravity separation means 500, 600 include the separation inlets 519 and 619 that is connected to the second outlet 514, 614 of the last gravity separation modules 510, 610 and the separation inlets 519, 619 first separation outlet 520 and 620 that are connected to the first product outlet 517 and 617. Finally, the product stream 652 of the last gravity separation module 510, 610 input through the second outlet 514 and 614 into the separation inlet 519, 619 is divided into 2 parts at the place where the separation inlet 519, 619 connect to the first separation outlet 520, 620, one part enters into the first separation outlet 520, 620. The product stream 512 and 612 of those gravity separation modules 510 and 610 wherein the first outlet 512, 612 connect to the first product outlet 517 and 617 aggregate through the fourth conduit 318 and 418 to the first product stream 360 and 460 output from the first product outlets 317 and 417.

In some embodiments, as shown in FIG. 1-6, the device 100, 200, 300, 400, 500, 600 include the second product stream 110, 210, 310, 410, 510, 610 that is connected to the second outlet 114, 214, 314, 414, 514, 614 of the final gravity separation module 121, 221, 321, 421, 521, 621.

In some embodiments, as shown in FIG. 1-2, the second product outlet 121, 221 are the second outlets 114 and 214 of the final gravity separation module 110, 210, while the output of the second product stream 170, 270 are the product stream 152 and 252 of the final gravity separation module 110, 210. The second product stream 170 contains a concentration of the first material lower than the first product stream 160, and contains a concentration of the second material higher than the first product stream 160. The second product stream 270 contains concentration of the first material higher than the first product stream 260, and contains a concentration of the second material lower than the first product stream 260.

In some embodiments, as shown in FIG. 3-6, the second product outlet 321, 421, 521, 621 and some of the first outlets 312, 412, 512, 612 are connected.

In some embodiments, as shown in FIG. 3-4, the second product outlets 321, 421 and the second outlet 314 and 414 of the final gravity separation module 310, 410 are connected. The first outlet 312, 412 and the product stream 351, 451 of the final gravity separation module 310, 410 which connect to the second product outlet 321, 421 and the product stream 352 and 452 of the final gravity separation module 310, 410 aggravate to be the second product stream 370 and 470 output from the second product outlet 321 and 421. The second product stream 370 and 470 contain concentration of the first material higher than the first product stream 360 and 460, and contains a concentration of the second material lower than the first product stream 360 and 460.

In some embodiments, as shown in FIG. 5-6, the apparatus 500 and 600 includes the second separation outlets 522 and 622 that are connected to the separate inlet 519, 619 and the second product outlet 521, 621. The product stream 652 of the final gravity separation module 510, 610 enters into the separation inlets 519 and 619 through the second outlet 514, 614, and entering into the separation outlets 522 and 622 in a part of two parts that are divided at the place where the separation inlets 519, 619 connect to the first separation outlets 520, 620.

The product stream 551 and 651 of the gravity separation module 510 and 610 where the first outlet 512 and 612 connect to the second product outlet 521, 621 and the outlet part of the second separation outlets 522 and 622 aggregate to be the second product stream 570 and 670 output from the second product outlets 521, 621 through the fifth conduit 523 and 623. The second product stream 570 and 670 contain concentration of the first material lower than the first product stream 560, 660 and contain the concentration of the second substance higher than the first product stream 560 and 660.

In some embodiments, the gravity separation means that includes ones connected in series and/or parallel combination may not include a separate inlet, first separating outlet and second separating outlet; the product stream output from the second outlet of the final combination of the separating modules can return back to certain (some) stages of one or more combinations of gravity separation module for cycle separation, discharge, or further process with other devices/methods.

In some embodiments, as shown in FIG. 7, the first outlet 712 of the first conduit 713 extending upwardly to gravity separation module 710 is the first product outlet 717 of the gravity separation means 700, and its output product stream 751 is the first product stream 760 that is used for gravity separation means 700, and the first outlet 712 of the first conduit 713 extending downwardly to the gravity separation module 710 is the second product outlet 721 used for the gravity separation means 700, whose output product stream 751 is for the second product stream 770 of the gravity separation means 700. The second product stream 770 contains a concentration of the first material lower than the first product stream 760, and contains a concentration of the second material higher than the first product stream 760.

In some embodiments, the cycle is not required, and the awaiting-separated stream 750 is output to the first product stream 760 and second product stream 770 directly through the combination of gravity separation module 790. The second outlet 714 is set to the product stream 752, which can be further separated, discharged or stored by using other ways/means.

In some embodiments, the first substance is oil and the second substance is water.

In some embodiments, the first product outlet 117, 217, 317, 417, 517, 617, 717 is situated at the position of the second product outlet 121, 221, 321, 421, 521, 621, 721 which is different in the vertical direction. In contrast, the product outlet 117, 217, 317, 417, 517, 617, 717, 121, 221, 321, 421, 521, 621, 721 that is situated at high top in the vertical direction, its output product stream 160, 260, 360, 460, 560, 660, 760, 170, 270, 370, 470, 570, 670, 770 has higher concentration than the first substance included in the output product situated at lower place and has lower concentration than that of the second substance.

In some embodiments, the means for gravity separating means 100, 200, 300, 400, 500, 600, 700 contain one or more other outlets (not shown in the figure), which are for outputting one or more other product streams (not shown in the figure). In some embodiments, the awaiting-separated stream 150, 250, 350, 450, 550, 650, 750 includes other substance other than the first, and the second substance, each of the respective other product stream contains other substances has more other substance.

In some embodiments, each of the gravity separation module 110, 210, 310, 410, 510, 610, 710 its first conduit 113, 213, 313, 413, 513, 613, 713 extend along different direction with the correspondent third conduit 116, 216, 316, 416, 516, 616, 716 respectively, thereby forming separation nodes based on difference of gravity and density for substance separation at its place where it connects.

In some embodiments, the present invention relates to oil and gas production system which is for gravity separation involved in the embodiment of the present invention. The awaiting-separated oil, gas, water, and/or combination of solid is input into the means of the embodiment in the present invention; it separates oil, gas, water and/or solid product stream which mainly constitute or are all certain kind of substance based on difference of density as per substance.

In some embodiments, the present invention relates to a method for gravity separation, which comprising: Input the awaiting-separated streams 100, 200, 300, 400, 500, 600, 700 which contains first substance and second substance to the inlet 111, 211, 311, 411, 511, 611, 711 of the means 150, 250, 350, 450, 550, 650, 750 that is involved in the embodiment of the present invention; the density of the first material is lower than the density of the second material; outputting the first product stream 160, 260, 360, 460, 560, 660, 760; and outputting the second product stream 170, 270, 370, 470, 570, 670, 770 in the comparison between the second product stream 170, 270, 370, 470, 570, 670, 770 and the first product stream 160, 260, 360, 460, 560, 660, 760 the concentration containing the first substance is different.

In some embodiments, the present invention relates to oil and gas production method for gravity separation involved in embodiment of the present invention.

The gravity separation means involved in the embodiment of the present invention can be made by materials which fit applied needs, such as stainless steel and other alloys and plastics.

The conduit, inlet and outlet that is involved in the embodiments of the present invention can be conduits, also can be other channels where the awaiting-separated stream, product flow entering into and/or passing by.

The apparatus and method for gravity separation that is involved in the embodiment of the present invention achieves the overall separation effect by superimposing separation fractal structure or structural deformation within/among the gravity separation module, which can be used for two phases or multi-phase separation circumstances of gas-liquid separation, liquid-solid separation, oil-water separation. The combined gravity separation module allows improving the overall amount of separation and effect significantly and the time the awaiting-separated stream stays and volume and area of the means can be greatly reduced. In addition, the combination of gravity separation module allows the device to have a good pressure effect, which can be used in deep-sea underwater separation and other high pressure separator occasions, such as deep-sea and/or off-shore oil and gas production processes. Moreover, when we modularize the gravity separation structure and for various combinations, it can improve production efficiency and flexibility of the device.

EXPERIMENTAL EXAMPLES

The following experimental examples can be references for a person of ordinary skill in the art to carry out embodiments of the present invention. These examples do not limit the scope of the claims.

Example 1

Working an outlet conduit network on an organic glass board in a thickness of about 20 mm; the network consists of two parallel flow conduits at length of about 350 mm, spacing at 50 mm and the other two parallel distanced flow conduits at an angle of about 120 degrees, wherein all flow conduits are in width of about 10 mm, depth of about 6 mm, and they are rectangular conduits; there are six connecting flowing conduits at length of 50 millimeters approximately and width of them are all about 3 mm and depth of about 6 mm, which are rectangular conduits. Cover the gusset of the conduit with another piece of organic glass in the same thickness, and line it with polyethylene film between two pieces of organic glass boards as the secondary sealing application, then press the cover with board with bolt, so that the flow conduit on the board forms a sealed conduit, thereby opening holes with a diameter of about 6 mm on the top, bottom, left and right side of the tailing of the board conduit structure that the cover corresponds as inlet and outlet for the connection to the external tubes. Make the device upright vertically as a gravity separation device. The total volume of the flow path of the gravity separation means is approximately 83 ml.

The gravity separation apparatus includes a sample for combining the gravity separation module, and the conduit which has 120-degree angle connecting to the shared inlet is the first conduit which extends obliquely upward and downward respectively; the other two second conduits where their flowing conduit at 120 degree of angle connect to the shared second outlet is connecting the flowing conduit to be the third conduit; the upper outlet is for the first product and the bottom outlet is for the second product outlet; the shared inlet is on the left and the shared second outlet is on the right.

Example 2

Mix Extols D60 and Primo 352 by volume ratio of 40.4% to acquire simulated oil at about 30 liters; extract the oil and about 30 liters of water with a centrifugal pump, then, mix them in the same pipe for awaiting-separated flow, wherein the flow ratio is 1:1. Enter the awaiting-separated stream into the gravity separation unit from the inlet of gravity separation unit prepared from Example 1 under gravity effect and going through conduit network to form the first product stream (upward fluid), the second product stream (downward fluid) and the third stream, wherein the upward fluid having reduced content of water is led from the upper outlet of gravity separation unit (the first product outlet), while the downward fluid having increased content of water is led from the bottom connection opening of the gravity separation means (the second product outlet) and the third stream is led from the connection opening of the right side (shared second outlet). Adjust the flow of upstream fluid and downstream fluid; three sets of experiments were done and the main operating conditions and results are shown in Table 1 below.

TABLE 1

| Experiment No. | 1 | 2 | 3 |
|---|---|---|---|
| Feeding flow, ml/sec | 8.3 | 8.3 | 8.3 |
| Time of stay, second | 10 | 10 | 10 |
| Upstream flow, ml/sec | 1.7 | 2.075 | 3 |
| The weight concentration of upstream fluid containing oil, % | >99 | >99 | >99 |
| Flow of downstream fluid, ml/sec | 1.7 | 2.075 | 3 |
| The concentration of the downstream fluid containing oil, mg/kg | 42.7 | 87.1 | 159.1 |
| The flow of third stream, ml/sec | 4.9 | 4.15 | 2.3 |

As it can be seen from Table 1, among all three sets of experiments, the oil concentration of upstream fluid is greater than 99%, and in group 1 and 2 experiments, the oil concentration of downstream fluid is less than 100 mg/l, and in the third set of experiment, the oil concentration of downstream fluid is less than 200 mg/l, which means that the gravity separation carries out more complete separation on the oil and water mixture. Such a short time of stay indicates that the gravity separation device is a compact and efficient oil-water separator.

Example 3

If we use a manner similar to that shown in FIG. 6, make the two combinations of gravity separation module be in parallel connection and make it with another combination for serial connection, we would acquire a two-level series combination of gravity separation means. Being different from the embodiment shown in FIG. 6, the fluid that was led by the second outlet of subsequent composition of gravity separation module is no further separated. The fluid set that is led from the outlet on the top edge vertically is the first product stream (upstream fluid), while the fluid set that was led from the outlet on the bottom edge vertically is the second product stream (downstream fluid), the fluid that was led from the second outlet following by the combination of gravity separation module is the third stream. If the running condition of the gravity separation apparatus has the same experimental condition as the second group of experiment in Example 2, then, the calculated related parameters of the gravity separation device is as shown in Table 2 below.

TABLE 2

| Module/device | Each combination of gravity separation module | Gravity separation means |
|---|---|---|
| Feeding flow, ml/sec | 8.3 | 16.6 |
| Time of stay, second | 10 | 20 |
| Upstream flow, ml/sec | 2.075 | 6.225 |
| The weight concentration of upstream fluid containing oil, % | >99 | >99 |
| Flow of downstream fluid, ml/sec | 2.075 | 6.225 |
| The concentration of the downstream fluid containing oil, mg/kg | 87.1 | 87.1 |
| The flow of third stream, ml/sec | 4.15 | 4.15 |

The entire gravity separation means with respect to only single combination of gravity separation module, the flow of the third stream is in consistency and maintains quality of separation, the processed flow of awaiting-separated flow has doubled.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. An apparatus for gravity separation, the apparatus comprising:
    a plurality of gravity separation modules, each gravity separation module comprising:
        an inlet,
        a first outlet,
        a first conduit connecting the inlet and the first outlet,
        a second outlet located vertically different from the first outlet,
        a second conduit in communication with the second outlet, and
        a plurality of third conduits connecting the first conduit and the second conduit,
    wherein the first conduit of one of two adjacent gravity separation modules extends from the corresponding inlet in a first direction, and the first conduit of the other of two adjacent gravity separation modules extends from the corresponding inlet in a second direction that is different from the first direction.

2. The apparatus of claim 1, wherein all of the first conduits extend in parallel from the corresponding inlets.

3. The apparatus of claim 1, wherein the inlets of the plurality of gravity separation modules are in communication with each other and the corresponding first conduits.

4. The apparatus of claim 3, wherein the second outlets of the plurality of gravity separation modules are in communication with each other and the corresponding second conduits.

5. The apparatus of claim 4, wherein the second outlets of the plurality of gravity separation module are in communication with each other and the corresponding inlets.

6. The apparatus of claim 1, further comprising:
    a first product outlet, and
    a fourth conduit in communication with the first outlets and the first product outlet.

7. The apparatus of claim 6, wherein the first product outlet is in communication with all of the first outlets.

8. The apparatus of claim 6, further comprising a separation inlet in communication with the second outlet of the last of the gravity separation modules, and a first separation outlet in communication with the separation inlet and the first product outlet.

9. The apparatus of claim 6, further comprising a second product outlet in communication with the second outlet of the last of the gravity separation modules.

10. The apparatus of claim 9, wherein the second product outlet is in communication with at least one of the first outlets.

11. The apparatus of claim 10, further comprising a separation inlet in communication with the second outlet of the last of the gravity separation modules, and a second separation outlet in communication with the separation inlet and the second product outlet.

12. An oil and gas production system comprising the apparatus of claim 1.

13. An apparatus for gravity separation, the apparatus comprising:
    a plurality of gravity separation modules, each gravity separation module comprising:
        an inlet,
        a first outlet,
        a first conduit connecting the inlet and the first outlet,
        a second outlet located vertically different from the first outlet,
        a second conduit in communication with the second outlet, and
        a plurality of third conduits connecting the first conduit and the second conduit,
    wherein the first conduits of some adjacent gravity separation modules extend in parallel from corresponding inlets along a first direction and the first conduits of some adjacent gravity separation modules extend in parallel from corresponding inlets along a second direction that is different from the first direction.

* * * * *